United States Patent
Park (10) Patent No.: US 12,517,158 B2
(45) Date of Patent: Jan. 6, 2026

(54) CONTROLLER FAILURE DIAGNOSING DEVICE AND METHOD

(71) Applicant: HL MANDO CORPORATION, Gyeonggi-do (KR)

(72) Inventor: Jae Sang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 214 days.

(21) Appl. No.: 18/224,049

(22) Filed: Jul. 19, 2023

(65) Prior Publication Data

US 2024/0255557 A1 Aug. 1, 2024

(30) Foreign Application Priority Data

Jan. 30, 2023 (KR) .................. 10-2023-0012136

(51) Int. Cl.
*G01R 25/00* (2006.01)
*H02P 27/06* (2006.01)

(52) U.S. Cl.
CPC .............. *G01R 25/00* (2013.01); *H02P 27/06* (2013.01)

(58) Field of Classification Search
CPC .............................. B62D 5/049; H02P 29/024
See application file for complete search history.

(56) References Cited

U.S. PATENT DOCUMENTS

| 9,765,468 B2 * | 9/2017 | Kim .......................... H02P 6/20 |
| 2002/0117990 A1 * | 8/2002 | Sawada .................. B60L 15/025 318/727 |
| 2015/0061708 A1 * | 3/2015 | Wang ..................... H02P 29/024 324/750.02 |
| 2015/0128662 A1 | 5/2015 | Kim et al. |
| 2016/0211790 A1 * | 7/2016 | Ajima ...................... H02P 27/08 |
| 2016/0352269 A1 * | 12/2016 | Takahashi ............. H02P 27/085 |

FOREIGN PATENT DOCUMENTS

KR 10-2015-0053559 5/2015

OTHER PUBLICATIONS

Office Action dated March May 29, 2025 for Korean Patent Application No. 10-2023-0012136 and its English translation provided by Applicant's foreign counsel.

* cited by examiner

*Primary Examiner* — Noam Reisner
(74) *Attorney, Agent, or Firm* — WOMBLE BOND DICKINSON (US) LLP (57) ABSTRACT

The controller failure diagnosing device and method may provide a controller failure diagnosing technique that may diagnose a failure in the controller using the characteristics of the controller when using a motor and an inverter. In particular, there may be provided a controller failure diagnosing device and method capable of diagnosing a failure in a controller by comparing the measured 3-phase voltage of the motor and the calculated controller output voltage or by determining entry into an unstable control area condition at an early stage.

18 Claims, 10 Drawing Sheets

CONTROLLER FAILURE DIAGNOSING DEVICE AND METHOD

CROSS-REFERENCE TO RELATED APPLICATION

This application claims priority from Korean Patent Application No. 10-2023-0012136, filed on Jan. 30, 2023, which is hereby incorporated by reference for all purposes as if fully set forth herein.

BACKGROUND

Field

The present embodiments relate to a controller failure diagnosing device and method.

Description of Related Art

Over the past few years, the number of automobiles equipped with steering devices using three-phase inverters and permanent magnet synchronous motors (PMSMs) has increased, and recently accounted for the largest share of total automobile sales. Since permanent magnet motors can easily achieve large output torque through inverters and controllers, and precise control is possible through the development of microprocessors and IC devices, use of permanent magnet motors increases rapidly not only in automobiles but also in other industries. Accordingly, it is necessary to research diagnostic techniques for a failure in the controller that drives the motor to ensure the reliability and safety of the system.

In particular, the permanent magnet synchronous motor (PMSM) may reduce errors by adopting a PI controller, but may not diagnosing a critical or minor failure in a control component, such as the PI controller, coordinate converter, current sensor, or motor position sensor (MPS).

Therefore, a need exists for technology for diagnosing a failure in the controller using the characteristics of the controller when a motor and an inverter are used.

BRIEF SUMMARY

In the foregoing background, the present embodiments may provide a controller failure diagnosing device that may diagnose a failure in the controller using the characteristics of the controller when using a motor and an inverter.

In an aspect, the present embodiments may provide a controller failure diagnosing device comprising a voltage measurer measuring a 3-phase voltage of a motor at an inverter output terminal connected to the motor, a voltage calculator inversely calculating a d-axis control voltage and a q-axis control voltage corresponding to an output voltage of a controller driving the motor, based on a design parameter of the controller and an input current of the controller including a d-axis reference current, a q-axis reference current, a d-axis feedback current, and a q-axis feedback current, and a failure diagnoser diagnosing a failure in the controller by comparing the measured 3-phase voltage and the calculated output voltage.

In another aspect, the present embodiments may provide a controller failure diagnosing method comprising a voltage measuring step measuring a 3-phase voltage of a motor at an inverter output terminal connected to the motor, a voltage calculating step inversely calculating a d-axis control voltage and a q-axis control voltage corresponding to an output voltage of a controller driving the motor, based on a design parameter of the controller and an input current of the controller including a d-axis reference current, a q-axis reference current, a d-axis feedback current, and a q-axis feedback current, and a failure diagnosing step diagnosing a failure in the controller by comparing the measured 3-phase voltage and the calculated output voltage.

According to the present embodiments, there may be provided a controller failure diagnosing device and method that may diagnose a failure in the controller using the characteristics of the controller when using a motor and an inverter.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

The disclosure relates to a controller failure diagnosing device and method.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

The motor in the disclosure is a motor applied to a steer-by-wire (SBW) system, which may generate a force in the direction opposite to the rotating direction of the steering wheel when the driver manipulates the steering wheel to thereby provide an appropriate steering sensation. The motor may be divided into brushless DC motors (BLDCM) and permanent magnet synchronous motors (PMSM, BLAC) according to the control method for counter electromotive force and armature current. For example, the permanent magnet synchronous motor may be a BLDC that applies a square wave current to a flat part of the counter electromotive force with a trapezoidal counter electromotive force and a permanent magnet synchronous motor (PMSM) that applies a sine wave current with a sine-wave counter electromotive force. Therefore, the motor in the disclosure may be a PMSM applied to the steer-by-wire system. However, this is merely an example, and the disclosure is not limited thereto.

The inverter in the disclosure is a 3-phase inverter and may include six semiconductor power switching elements, such as a bipolar transistor (BJT), a field effect transistor (FET), an insulated gate bipolar transistor (IGBT), and a gate turn-off (GTO) thyristor. Further, the 3-phase inverter may apply a sine wave voltage, modulated as a square wave by adjusting the turn-on/turn-off time for the six semiconductor power switching elements, to the motor, supplying a sine wave current. To control the three-phase current supplied to the motor, a position sensor of the motor rotor and a current sensor for measuring the 3-phase current of the motor may be included. Further, the 3-phase inverter may include a detection circuit for detecting a short-circuit current generated due to, e.g., a failure in the semiconductor power switching element.

Figure 1:
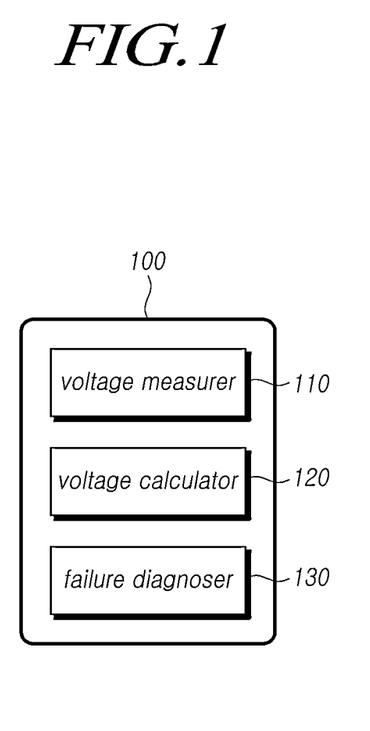
FIG. 1 is a view illustrating a controller failure diagnosing device according to an embodiment of the disclosure.

FIG. 1 is a view illustrating a controller failure diagnosing device according to an embodiment of the disclosure Referring to FIG. 1, a controller failure diagnosing device 100 according to an embodiment of the disclosure may include a voltage measurer 110, a voltage calculator 120, and a failure diagnoser 130. As an example, a controller failure diagnosing device 100 may include a voltage measurer 110 measuring a 3-phase voltage of a motor at an inverter output terminal connected to the motor, a voltage calculator 120 inversely calculating a d-axis control voltage and a q-axis control voltage corresponding to an output voltage of a controller driving the motor, based on a design parameter of the controller and an input current of the controller including a d-axis reference current, a q-axis reference current, a d-axis feedback current, and a q-axis feedback current, and a failure diagnoser 130 diagnosing a failure in the controller by comparing the measured 3-phase voltage and the calculated output voltage.

The voltage measurer 110 of the controller failure diagnosing device 100 according to an embodiment may measure a 3-phase voltage of the motor at an inverter output terminal connected to the motor. For example, the voltage measurer 110 may measure a 3-phase alternating current (AC) voltage actually applied to the motor using a voltage sensor installed at an inverter output terminal connected to the motor. For example, the voltage measurer 110 may measure a 3-phase AC voltage between an upper-side switch (high side FET) and a lower-side switch (low side FET) of the inverter output terminal. Further, the voltage measurer 110 may measure the 3-phase AC voltage including the AC voltage Vag of phase a, the AC voltage Vbg of phase b, and the AC voltage Vcg of phase c.

The voltage calculator 120 of the controller failure diagnosing device 100 according to an embodiment may inversely calculate the output voltage of the controller based on the design parameter of the controller driving the motor and the input current of the controller. For example, the voltage calculator 120 may inversely calculate the d-axis control voltage and the q-axis control voltage corresponding to the output voltage of the controller based on the design parameter of the controller driving the motor and the input current of the controller including the d-axis reference current, the q-axis reference current, the d-axis feedback current, and the q-axis feedback current. Further, the voltage calculator 120 may calculate the 3-phase AC voltage from the d-axis control voltage and the q-axis control voltage corresponding to the output voltage of the current controller. For example, the controller may include a first controller generating the d-axis control voltage and a second controller generating the q-axis control voltage, and the first controller and the second controller may include a proportional controller and an integral controller, respectively.

The failure diagnoser 130 of the controller failure diagnosing device 100 according to an embodiment may diagnose the controller as a failure by comparing the measured 3-phase voltage with the calculated output voltage. For example, the failure diagnoser 130 may diagnose the controller as a failure by comparing the measured 3-phase voltage with the output voltage calculated as the product of the magnitude of the current error generated as the input current (reference current) of the controller is changed and the design parameter of the controller. For example, the failure diagnoser 130 may inversely calculate the current error from the measured 3-phase voltage. Then, the failure diagnoser 130 may calculate the reference current by adding the feedback current to the current error. In this case, if the calculated reference current does not match the reference current used as the input of the controller, the failure diagnoser 130 may diagnose the controller as a failure. Further, if the calculated output voltage does not match the output voltage of the controller, the failure diagnoser 130 may diagnose the controller as a failure.

Also, e.g., if the output voltage of the controller is higher than the voltage of the battery supplying the DC voltage to the inverter, the failure diagnoser 130 may diagnose the controller as a failure. For example, the output voltage of the controller may be the sum of the output voltage of the proportional controller and the output voltage of the integral controller, and may be a value limited by the battery voltage. Accordingly, if the output voltage of the controller is maintained as the maximum value even if the input current of the controller is not 0, the failure diagnoser 130 may diagnose the controller as a failure.

Further, e.g., if the output voltage of the integral controller does not change in response to a variation in the current error input to the controller, the failure diagnoser 130 may diagnose the controller as a failure. For example, if the output voltage of the integral controller is fixed if the current error is varied, the failure diagnoser 130 may diagnose the controller as a failure. Alternatively, if the sign of the current error is changed and the sign of the output voltage of the integral controller is not changed, the failure diagnoser 130 may diagnose the controller as a failure. As another example, if the output voltage of the proportional controller does not decrease even after a specific time if the current error converges, the failure diagnoser 130 may diagnose the controller as a failure.

As another example, if the rotating speed and the output torque of the motor are in the normal state and do not correspond to the first quadrant mode or the third quadrant mode among the four quadrant operation modes, the failure diagnoser 130 may diagnose the controller as a failure. Further, the first quadrant mode and the third quadrant mode may be set as normal areas of the integral controller. For example, if the rotating speed and the output torque of the motor are in the normal state and do not correspond to the first quadrant mode or the third quadrant mode, the failure diagnoser 130 may diagnose the controller as a failure. Further, if the controller is diagnosed as a failure, the failure diagnoser 130 may determine whether the rotating speed and the output torque of the motor are included in a preset control area condition, generate a signal for switching to 3-phase short according to the determination result, and transmit the signal to the controller.

Specifically, if it is determined that the rotating speed and the output torque of the motor are not included in the control area condition, the failure diagnoser 130 may generate a signal for switching to 3-phase short. Here, 3-phase short may be a state in which the upper switching element or the lower switching element for each phase of the inverter is simultaneously turned on by controlling the switching operation. Further, the failure diagnoser 130 may generate a switching signal such that the upper switching element or the lower switching element forming the 3-phase short state is alternately turned on based on the temperature of the switching element. This may additionally provide an effect of preventing thermal damage to the switching element due to a controller failure.

Figure 2:
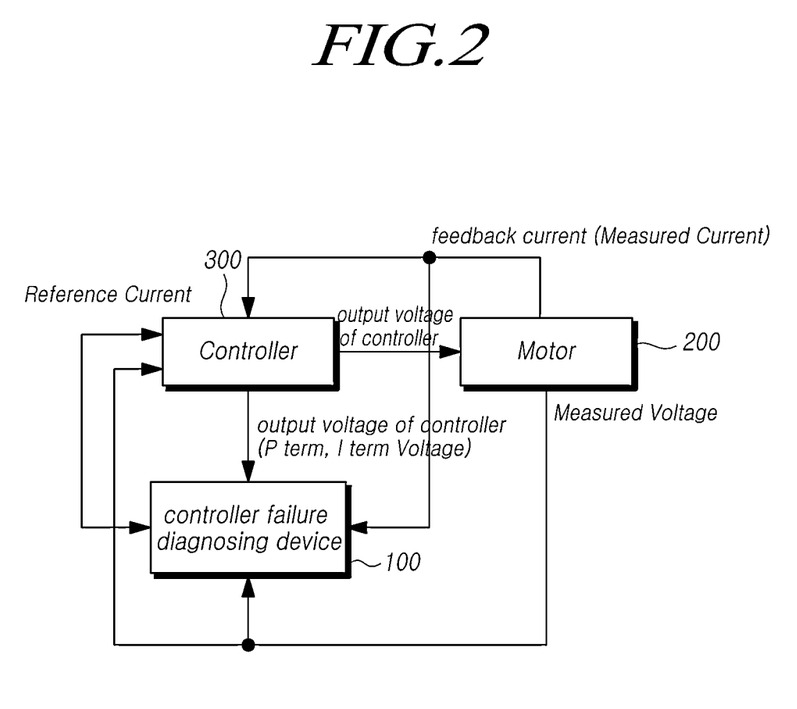
FIG. 2 is a view illustrating a system to which a controller failure diagnosing device according to an embodiment of the disclosure applies.

FIG. 2 is a view illustrating a system to which a controller failure diagnosing device according to an embodiment of the disclosure applies.

Referring to FIG. 2, an example in which a controller failure diagnosing device according to an embodiment of the disclosure is applied to a motor control system to diagnose a failure in a controller may be described. For example, the controller 300 may generate and output a control voltage based on the 3-phase currents $I_a$, $I_b$, and $I_c$ measured at a coil (e.g., a stator coil or a field coil) in the motor 200. For example, the controller 300 may dq-convert the 3-phase currents $I_a$, $I_b$, and $I_c$ flowing in the coil in the motor 200 to dq into the d-axis reference current and the q-axis reference current. The controller 300 may output the d-axis control voltage and the q-axis control voltage from the d-axis reference current and the q-axis reference current. Here, the output voltage may be a PWM control signal generated according to the d-axis control voltage and the q-axis control voltage. The so-generated PWM control signal may control the switching operation of the switching elements in the inverter.

In order to diagnose the failure in the controller 300, the controller failure diagnosing device 100 may require the 3-phase voltages of the motor 200 and design parameters inside the controller 300. For example, if the controller 300 is a proportional-integral controller (PI) including a proportional controller and an integral controller, the design parameters may be a proportional gain $k_p$ and an integral gain $k_i$. Here, the larger the proportional gain, the faster the output value for the error follows the reference current, so that the response speed increases, but an overshoot may occur which causes oscillation. On the other hand, if the proportional gain is too small, the response speed may be slow and the normal state may not be reached. Further, the integral gain may reduce the normal state error that occurs when the proportional controller is used. However, the integral gain may increase the time to reach the target value.

Specifically, in the normal state, the controller 300 may have a value close to 0 because it is possible to operate normally only with an output from feedforward control. On the other hand, if the reference current changes, the controller 300 may output each control voltage determined as the product of the magnitude of the generated current error and a preset gain. If the reference current is input to the controller 300 from 0 A to 10 A by a step function, the magnitude of the current error may be initially 10 A, and if the proportional gain is 5, the voltage output from the proportional controller may be 10×5V.

Accordingly, the failure diagnoser 130 of the controller failure diagnosing device 100 may inversely calculate the current error from the measured 3-phase voltage of the motor 200, and calculate the reference current by adding the feedback current. In this case, if the calculated reference current does not match the reference current used as the input of the controller 300 or the output voltage of the controller 300, the failure diagnoser 130 may diagnose the controller as a failure 300.

Figure 3:
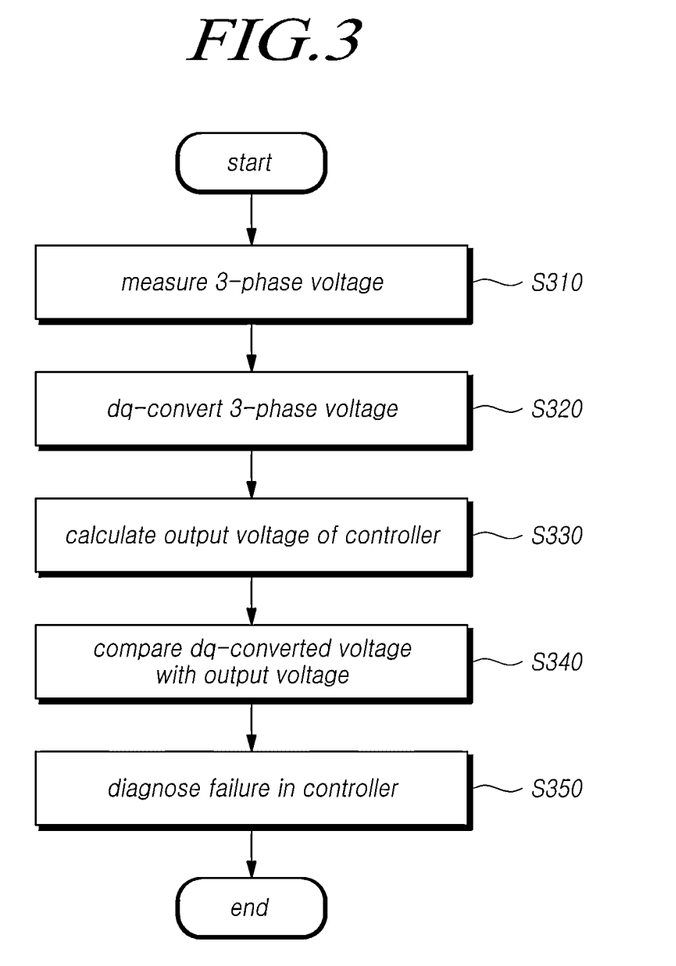
FIG. 3 is a flowchart illustrating operations of a controller failure diagnosing device according to an embodiment of the disclosure.

FIG. 3 is a flowchart illustrating operations of a controller failure diagnosing device according to an embodiment of the disclosure.

Referring to FIG. 3, an example operation in which the controller failure diagnosing device 100 according to an embodiment of the disclosure diagnoses a failure in the controller based on an output voltage of the controller may be described. As an example, the voltage measurer 110 of the controller failure diagnosing device 100 may measure a 3-phase voltage of the motor at an inverter output terminal connected to the motor (S310). For example, the voltage measurer 110 may measure AC voltages of three phases including phase a, phase b, and phase c between an upper-side switch (high side FET) and a lower-side switch (low side FET) of the inverter output terminal. Here, the measured 3-phase voltage of the motor may be a voltage substituted with a PWM control signal.

For example, the voltage calculator 120 of the controller failure diagnosing device 100 may dq-convert the measured 3-phase voltage (S320). For example, the voltage calculator 120 may convert the 3-phase AC voltages Vag, Vbg, and Vcg into a d-axis voltage Vd and a q-axis voltage Vq in the form of a DC voltage through coordinate conversion. Specifically, the voltage calculator 120 may convert the 3-phase AC voltages Vag, Vbg, and Vcg into the d-axis voltage Vd and the q-axis voltage Vq in the form of the DC voltage using the Clark transformation algorithm and the Park transformation algorithm.

For example, the voltage calculator 120 of the controller failure diagnosing device 100 may calculate the output voltage of the controller based on the input current of the controller (S330). For example, the failure diagnoser 130 may calculate the output voltage of the d-axis controller as the sum of the voltage output from the proportional controller included in the first controller and the voltage output from the integral controller. The failure diagnoser 130 may calculate the output voltage of the q-axis controller as the sum of the voltage output from the proportional controller included in the second controller and the voltage output from the integral controller. In other words, the output voltage of the d-axis controller and the output voltage of the q-axis controller may be inversely calculated based on the input current of the controller.

For example, the failure diagnoser 130 of the controller failure diagnosing device 100 may compare the dq-converted voltage with the output voltage of the controller (S340). For example, the failure diagnoser 130 may compare the voltage dq-converted from the measured 3-phase voltage with the sum of the output voltages of the proportional controller and the integral controller. Specifically, the failure diagnoser 130 may compare the d-axis voltage and the q-axis voltage dq-converted from the measured 3-phase voltage with the output voltage of the d-axis controller and the output voltage of the q-axis controller.

For example, the failure diagnoser 130 of the controller failure diagnosing device 100 may diagnose a failure in the controller according to the comparison result (S350). For example, the failure diagnoser 130 may compare the d-axis voltage and the q-axis voltage dq-converted from the measured 3-phase voltage with the output voltage of the d-axis controller and the output voltage of the q-axis controller, and may diagnose the controller as a failure if they do not match. Alternatively, the failure diagnoser 130 may diagnose the controller as a failure if the reference current inversely calculated from the measured 3-phase voltage using the design parameter of the controller does not match the reference current used as the input of the controller.

Figure 4:
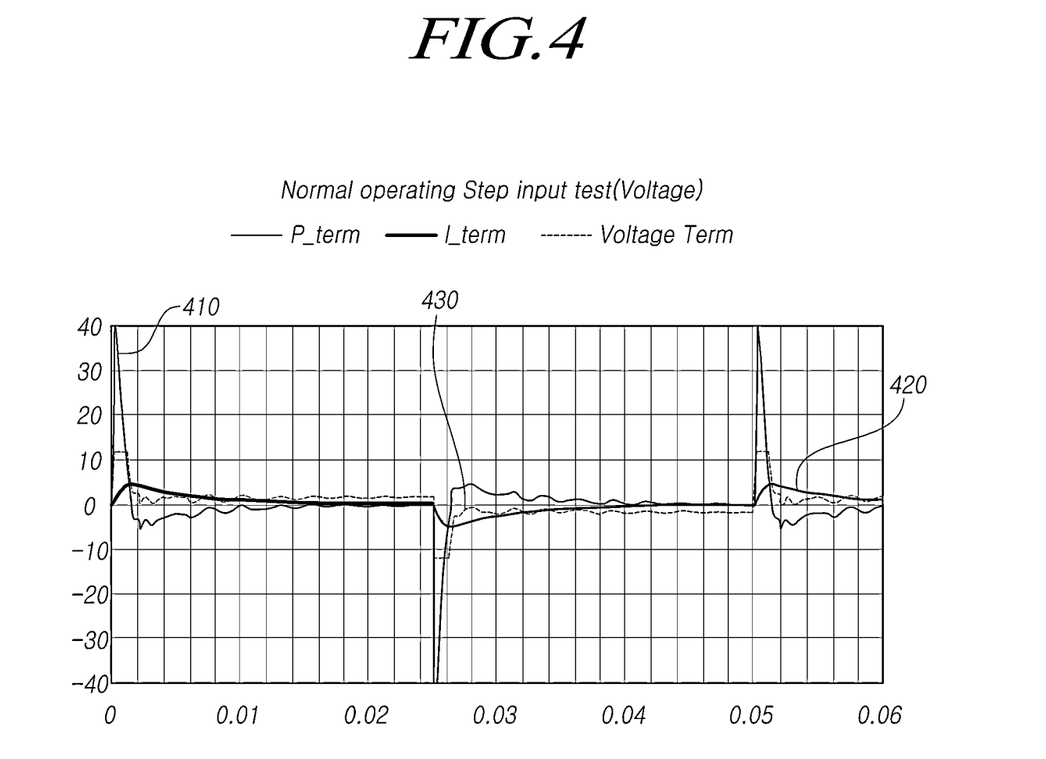
FIG. 4 is a view illustrating an output voltage of a controller normally operating according to an embodiment of the disclosure.

FIG. 4 is a view illustrating an output voltage of a controller normally operating according to an embodiment of the disclosure.

Referring to FIG. 4, output voltages of a proportional controller and an integral controller in a normally operating controller according to an embodiment may be described. For example, the controller 300 may control the inverter connected to the motor 200 based on the reference current and the feedback current measured using the current sensor. For example, in general, the controller 300 may configure a two-dimensional map of the input current input to the controller 300 and the output current, and may diagnose a failure if out of the range of the map. In this case, a failure occurring within the range of the map may not be diagnosed. Or, if the feedback current is maintained as an arbitrary current value or more than the reference current according to an overcurrent difference method, the controller 300 may diagnose it as a failure. The arbitrary current value may be set to a level that may affect the driver. However, in this case, a tuning process is required because the arbitrary current value has a different magnitude and duration from vehicle to vehicle, and a failure occurring below the arbitrary current value may not be diagnosed.

Referring to FIG. 4, if the controller 300 that operates normally reaches the normal state, the output voltage 420 of the integral controller may maintain a predetermined value or decrease. On the other hand, if the actually measured feedback current does not keep up with the reference current, the output voltage 410 of the proportional controller and the output voltage 420 of the integral controller may be output as the maximum value due to the current error. In this case, the output voltage 430 of the controller 300 may be the sum of the output voltage 410 of the proportional controller and the output voltage 420 of the integral controller.

Accordingly, if the output voltage 430 of the controller 300 is higher than the voltage of the battery supplying the DC voltage to the inverter, the failure diagnoser 130 of the controller failure diagnosing device 100 according to an embodiment may diagnose the controller as a failure. For example, if the output voltage 430 of the controller 300 is maintained as the maximum value limited by the battery voltage in the sum of the output voltage 410 of the proportional controller and the output voltage 420 of the integral controller, the failure diagnoser 130 may diagnose the controller as a failure 300. In other words, if the output voltage 430 of the controller 300 is maintained as the maximum value even if the input current of the controller 300 is not 0, the failure diagnoser 130 may diagnose the controller as a failure 300. Further, the failure diagnoser 130 may also diagnose whether the failure mode is being entered, and may reduce the diagnosis time.

Figure 5:
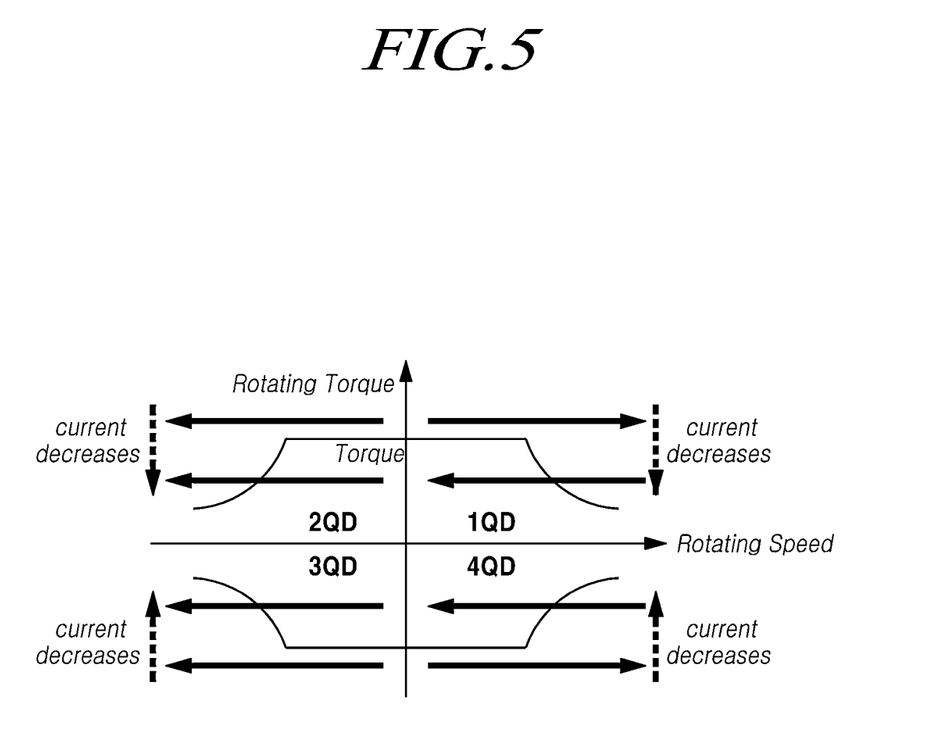
FIG. 5 is a view illustrating an example of diagnosing as a failure by a controller failure diagnosing device according to an embodiment of the disclosure.

FIG. 5 is a view illustrating an example of diagnosing as a failure by a controller failure diagnosing device according to an embodiment of the disclosure.

Referring to FIG. 5, an example in which a controller diagnosed as a failure by a controller failure diagnosing device according to an embodiment of the disclosure diverges the output may be described. For example, the failure diagnoser 130 of the controller failure diagnosing device 100 may determine that the input or output of the controller is abnormal and deviates from the control area condition. Here, the control area condition may be an area in which the output of the controller is diverged according to the rotating speed and the output torque of the motor, making it impossible to control. For example, the motor and the controller driving the motor may perform bidirectional driving in a clockwise direction (CW) or a counterclockwise direction (CCW). The motoring state is a state in which a current is applied and the motor rotates, and any state in which the motor rotates in a predetermined direction may be defined as a first quadrant mode of +torque and +speed. Further, any state that rotates in the direction opposite to the predetermined direction may be defined as a third quadrant mode of −torque and −speed. On the other hand, the regenerating state is a state in which a current is applied to the motor through the controller to obtain torque and rotation, but the torque and rotational directions are different and may be defined as a second quadrant mode or fourth quadrant mode.

Specifically, if the external torque is constant in the motoring state, the torque of the motor may be reduced as the current of the motor decreases, so that the rotating speed may also be reduced. However, in the regenerating state, the motor may be driven as a generator by external force. Accordingly, if the torque of the motor decreases as the current of the motor decreases, the rotating speed may further increase and controllability may be lost. The torque of the motor may be expressed as Equation 1 and Equation 2.

$$T_{em} = I\frac{d}{dt}\omega_m + B\omega_m + T_L \qquad \text{[Equation 1]}$$

Here, $T_{em}$, TL, and J may be the electromagnetic torque, the load torque, and the moment of inertia of the load, respectively, and B may be the coefficient of friction.

$$T = \frac{3}{2}\frac{P}{2}\{\Psi_a i_q + (L_d i_d) i_q - (L_q i_q) i_d\} \qquad \text{[Equation 2]}$$

Here, T may be the torque generated by the motor, $\Psi$ may be the magnetic flux density of the rotor, $L_d$ may be the d-axis inductance, $L_q$ may be the q-axis inductance, $i_d$ may be the d-axis current, and $i_q$ may be the q-axis current.

Accordingly, e.g., if the loads of the input and output of the controller are opposite, and the output of the integral controller continues to increase, the failure diagnoser 130 may diagnose the current sensor as a failure. Specifically, if the input of the controller driving the motor is in the first quadrant mode and the output of the controller is in the second quadrant mode, the failure diagnoser 130 may diagnose the current sensor as a failure. This is because if the output of the controller is instantaneously changed due to disturbance, the output of the controller may be returned, but if the current sensor is broken, the output of the controller may be maintained in the changed state.

Figure 6A:
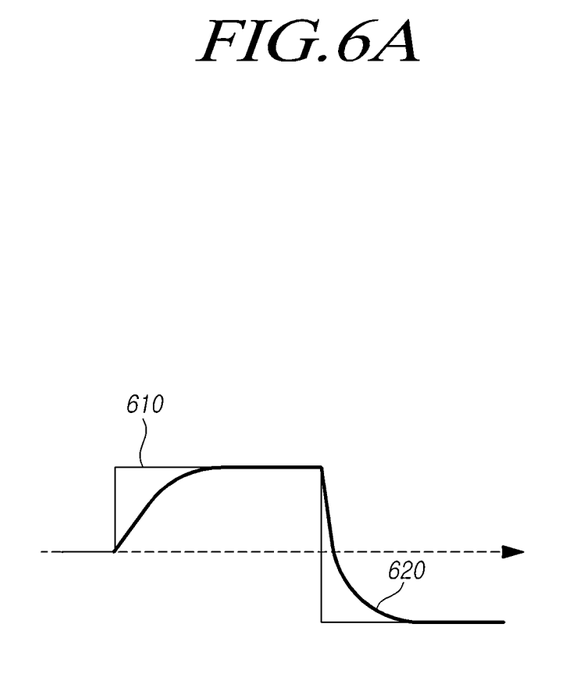
FIGS. 6A and 6B are views illustrating an output voltage of a controller normally operating and an output voltage of a controller operating in a faulty state according to an embodiment of the disclosure.
Figure 6B:
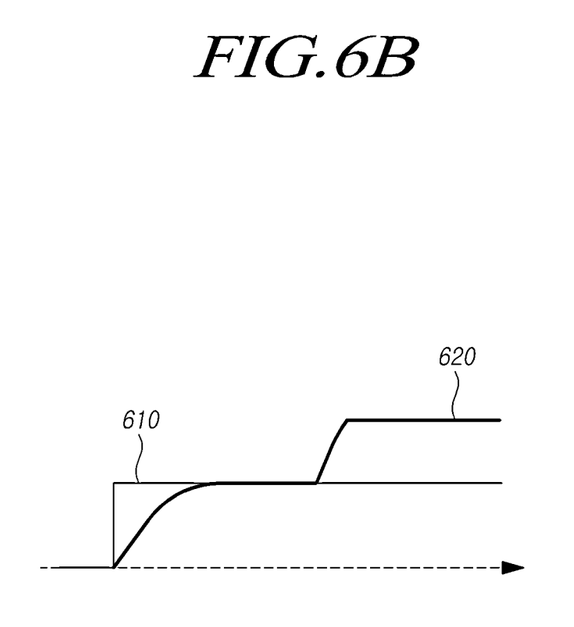

FIGS. 6A and 6B are views illustrating an output voltage of a controller normally operating and an output voltage of a controller abnormally operating according to an embodiment of the disclosure.

Referring to FIGS. 6A and 6B, comparison between the output voltage of an integral controller operating normally and the output voltage of an integral controller operating in a faulty state may be described. For example, the failure diagnoser 130 of the controller failure diagnosing device 100 may diagnose a failure in the controller based on the output voltage of the integral controller. For example, if the signs of the input and output of the current sensor are opposite to each other and the rotating speed and the output torque of the motor are changed from the first quadrant mode to the second quadrant mode or the fourth quadrant mode, the failure diagnoser 130 may diagnose the controller as a failure. In this case, when the mode is changed to the second quadrant mode may be when the direction of the speed is wrong and, when changed to the fourth quadrant mode may be when the direction of the current is wrong. Accordingly, if the output voltage of the integral controller continues to increase and is maintained as the maximum value as the current error does not converge due to the wrong direction of the current sensor, the failure diagnoser 130 may diagnose the controller as a failure. In other words, the controller failure diagnosing device 100 may diagnose a failure due to an incorrect connection of the current sensor, an excessive noise input, a memory error, or the like.

In FIG. 6A, the output voltage 620 of the integral controller output according to the required voltage 610 of the controller when the controller operates normally may be identified. On the other hand, in FIG. 6B, it may be identified that the output voltage 620 of the integral controller output according to the required voltage 610 of the controller when the controller operates in a faulty state is maintained as the limited maximum value. This may be because the output voltage is limited to the maximum value as the sign of the current is incorrectly recognized due to the failure in the current sensor.

Figure 7:
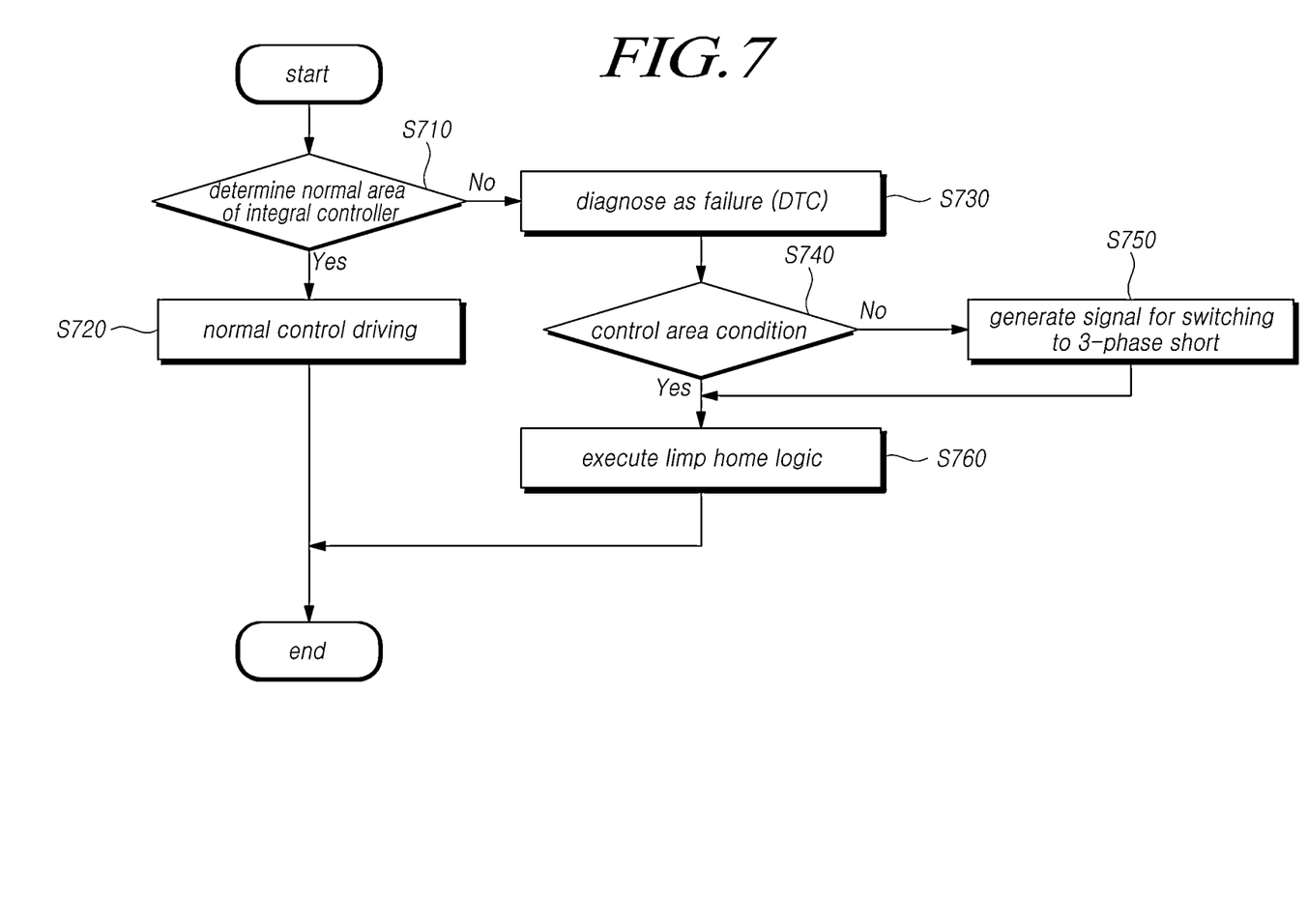
FIG. 7 is a flowchart illustrating an operation of diagnosing as a failure by a controller failure diagnosing device according to an embodiment of the disclosure.

FIG. 7 is a flowchart illustrating an operation of diagnosing as a failure by a controller failure diagnosing device according to an embodiment of the disclosure.

Referring to FIG. 7, an example operation in which the controller failure diagnosing device 100 according to an embodiment of the disclosure diagnoses a failure in the controller based on an output voltage of the controller may be described. For example, the failure diagnoser 130 of the controller failure diagnosing device 100 may determine a normal area of the integral controller (S710). For example, the failure diagnoser 130 may determine the normal area based on whether the integral controller is in the first quadrant mode or the third quadrant mode among the four quadrant operation modes. This is because the controller driving the motor applied to the steering control device is not driven in the second quadrant mode or fourth quadrant mode, in the normal state. For example, if the vehicle is at 80 khp in a turning section, the steering control device may be driven in the first quadrant mode or the third quadrant mode. However, if the steering control device moves the steering wheel rapidly or an impact is applied to the lower portion of the vehicle, it may be driven in the second quadrant mode or the fourth quadrant mode. Accordingly, if the steering control device is in a normal state with a predetermined speed predetermined load, the failure diagnoser 130 may determine that the steering control device is in the normal region only if the steering control device should be driven in the first quadrant mode or the third quadrant mode.

For example, if the integral controller corresponds to the normal area, the failure diagnoser 130 of the controller failure diagnosing device 100 may normally drive the control (S720).

For example, if the integral controller does not correspond to the normal area, the failure diagnoser 130 of the controller failure diagnosing device 100 may diagnose the controller as a failure (S730). For example, if the rotating speed and the output torque of the motor are in the normal state, the failure diagnoser 130 may diagnose the controller as a failure (diagnostic trouble code (DTC)) if the integral controller does not correspond to the first quadrant mode or the third quadrant mode preset as the normal area.

For example, if the controller 100 is diagnosed as a failure, the failure diagnoser 130 of the controller failure diagnosing device 100 may determine whether the rotating speed and the output torque of the motor are included in a preset control area condition (S740). For example, if the controller is diagnosed as a failure, the failure diagnoser 130 may determine whether the controller is included in a preset control area condition based on physical characteristics of the motor and the controller. As described above with reference to FIG. 6, the control area condition may be preset as an area in which the output of the controller is diverged according to the rotating speed and the output torque of the motor, making it impossible to control.

For example, if the failure diagnoser 130 of the controller failure diagnosing device 100 is not included in the control area condition, the failure diagnoser 130 may generate a signal for switching to 3-phase short (S750). For example, if the controller is not included in the control area condition, the output may continue to diverge or the motor may be driven as a generator. Then, the current applied to the battery increases, damaging the fuse. To prevent this, if not included in the control area condition, the failure diagnoser 130 may generate a signal for switching to 3-phase short and transmit the signal to the controller. By forming a 3-phase shorted state, it is possible to provide an effect of reducing the speed by generating a reverse torque according to the current corresponding to an internally generated voltage.

For example, if included in the control area condition, the failure diagnoser 130 of the controller failure diagnosing device 100 may execute a limp home logic (S760). For example, if the controller is diagnosed as a failure but is included in the control area condition, the failure diagnoser 130 may execute the limp home logic to drive the motor with a preset default value.

Figure 8:
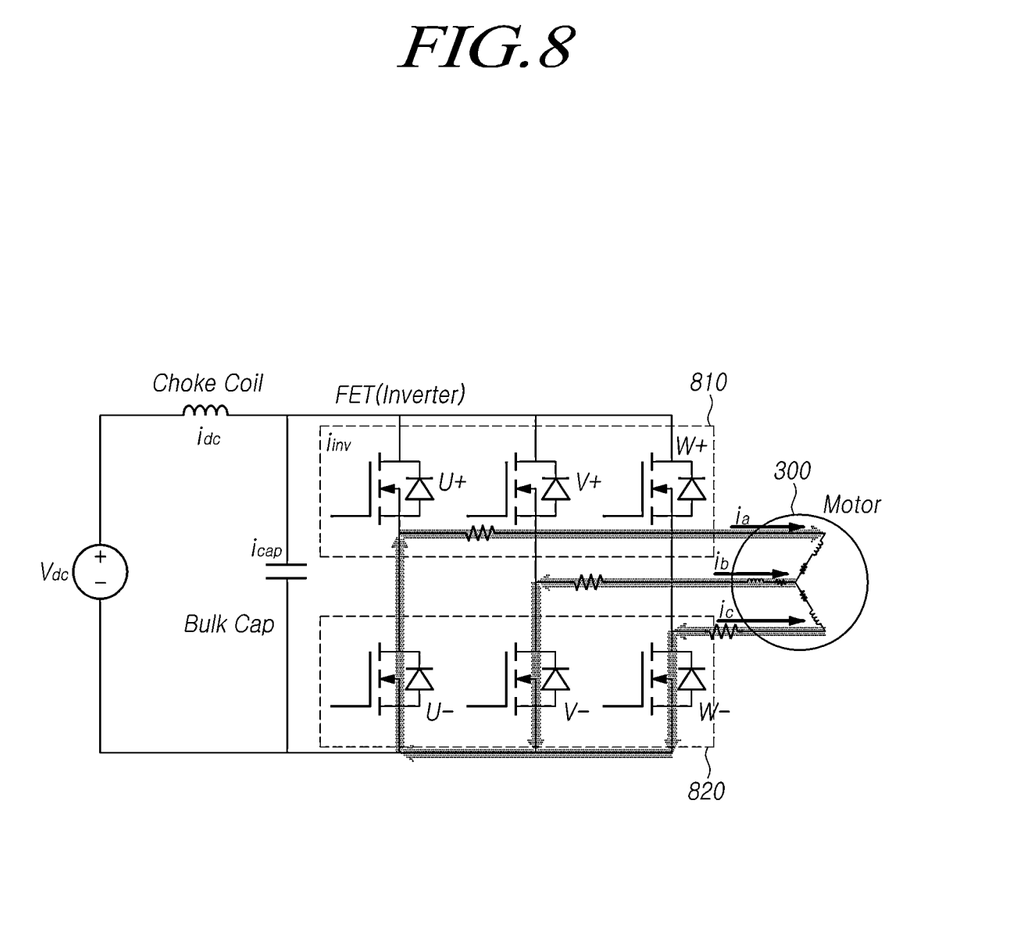
FIG. 8 is a view illustrating an example of forming a three-phase shorted state by a controller failure diagnosing device according to an embodiment of the disclosure.

FIG. 8 is a view illustrating an example of forming a three-phase shorted state by a controller failure diagnosing device according to an embodiment of the disclosure.

An example of generating a switching signal for forming a 3-phase shorted state in some cases where the controller failure diagnosing device according to an embodiment of the disclosure diagnoses a failure in the controller may be described with reference to FIG. 8. As another example, if the rotating speed and the output torque of the motor 200 are in the normal state and do not correspond to the first quadrant mode or the third quadrant mode among the four quadrant operation modes, the failure diagnoser 130 of the controller failure diagnosing device 100 may diagnose the controller as a failure. Accordingly, when the controller is diagnosed as a failure, if it is determined that the rotating speed and the output torque of the motor 200 are not included in the preset control area condition, the failure diagnoser 130 may generate a signal for switching to 3-phase short and transfer the signal to the controller. Further, the failure diagnoser 130 may generate a switching signal such that the upper switching element or the lower switching element forming the 3-phase short state is alternately turned on based on the temperature of the switching element.

For example, the signal for switching to 3-phase short may be a signal for controlling the switching operation such that the upper switching element 810 or the lower switching element 820 for each phase of the inverter is simultaneously turned on. Specifically, the switching elements of the inverter may include use upper switching elements 810 connected to the positive voltage-side circuit unit and lower switching elements 820 connected to the negative voltage-side circuit unit. Two switching elements may be connected in series to each phase (U phase, V phase, and W phase) and may be connected to the motor coil of each phase of the motor. Accordingly, the signal for switching to 3-phase short may be a signal for shorting each phase motor coil of the motor by turning on all three upper switching elements 810 and turning off all three lower switching elements 820. Or, the signal for switching to 3-phase short may turn on all of the three lower switching elements 820 connected to the negative voltage side of each phase and turn off all of the three upper switching elements 810 connected to the positive voltage side of each phase, shortening the motor coil of each phase of the motor.

Hereinafter, a controller failure diagnosing method that may be performed by the controller failure diagnosing device 100 described with reference to FIGS. 1 to 8 is described.

Figure 9:
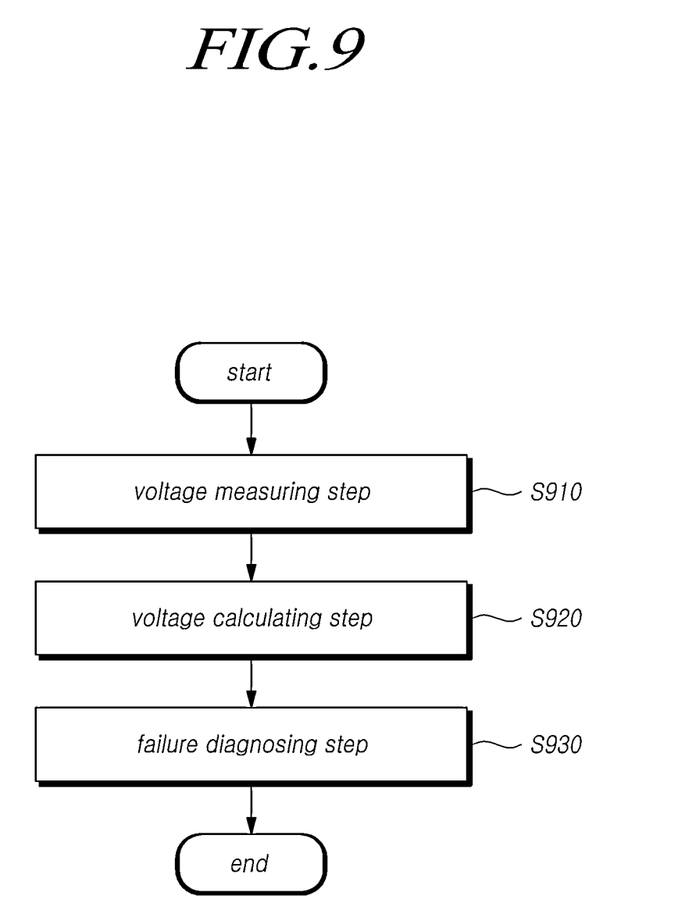
FIG. 9 is a flowchart illustrating a controller failure diagnosing method according to an embodiment of the disclosure.

FIG. 9 is a flowchart illustrating a controller failure diagnosing method according to an embodiment of the disclosure.

Referring to FIG. 9, the controller failure diagnosing method according to an embodiment of the disclosure may include a voltage measurement step (S910). As an example, the controller failure diagnosing device may measure a 3-phase voltage of the motor at an inverter output terminal connected to the motor. For example, the controller failure diagnosing device may measure a 3-phase AC voltage actually applied to the motor using a voltage sensor installed at an inverter output terminal connected to the motor. Specifically, the controller failure diagnosing device may measure a 3-phase AC voltage between an upper-side switch (high side FET) and a lower-side switch (low side FET) of the inverter output terminal. The 3-phase AC voltages may include the AC voltage Vag of phase a, the AC voltage Vbg of phase b, and the AC voltage Vcg of phase c.

The controller failure diagnosing method according to an embodiment may include a voltage measurement step (S920). For example, the controller failure diagnosing device may inversely calculate the output voltage of the controller based on the design parameter of the controller driving the motor and the input current of the controller. For example, the controller failure diagnosing device may inversely calculate the d-axis control voltage and the q-axis control voltage corresponding to the output voltage of the controller based on the design parameter of the controller driving the motor and the input current of the controller including the d-axis reference current, the q-axis reference current, the d-axis feedback current, and the q-axis feedback current. Further, the controller failure diagnosing device may inversely calculate the d-axis control voltage and the q-axis control voltage corresponding to the output voltage of the controller based on the design parameter of the controller driving the motor and the input current of the controller including the d-axis reference current, the q-axis reference current, the d-axis feedback current, and the q-axis feedback current. In this case, the controller may include a first controller generating the d-axis control voltage and a second controller generating the q-axis control voltage, and the first controller and the second controller may include a proportional controller and an integral controller, respectively.

The controller failure diagnosing method according to an embodiment may include a failure diagnosing step (S930). For example, the controller failure diagnosing device may diagnose the controller as a failure by comparing the measured 3-phase voltage with the calculated output voltage. For example, the controller failure diagnosing device may diagnose the controller as a failure by comparing the measured 3-phase voltage with the output voltage calculated as the product of the magnitude of the current error generated as the input current (reference current) of the controller is changed and the design parameter of the controller. Specifically, the controller failure diagnosing device may calculate the reference current by inversely calculating a current error from the measured 3-phase voltage and adding a feedback current to the current error. In this case, if the calculated reference current does not match the reference current used as the input of the controller, the controller failure diagnosing device may diagnose the controller as a failure. Further, if the calculated output voltage does not match the output voltage of the controller, the controller failure diagnosing device may diagnose the controller as a failure.

Further, as an example, if the output voltage of the controller is higher than the voltage of the battery supplying the DC voltage to the inverter, the controller failure diagnosing device may diagnose the controller as a failure. For example, the output voltage of the controller may be the sum of the output voltage of the proportional controller and the output voltage of the integral controller, and may be a value limited by the battery voltage. Accordingly, if the output voltage of the controller is maintained as the maximum value even if the input current of the controller is not 0, the controller failure diagnosing device may diagnose the controller as a failure.

Further, e.g., if the output voltage of the integral controller does not change in response to a variation in the current error input to the controller, the controller failure diagnosing device may diagnose the controller as a failure. For example, if the output voltage of the integral controller is fixed if the current error is varied, the controller failure diagnosing device may diagnose the controller as a failure. Alternatively, if the sign of the current error is changed and the sign of the output voltage of the integral controller is not changed, the controller failure diagnosing device may diagnose the controller as a failure. As another example, if the output voltage of the proportional controller does not decrease even after a specific time if the current error converges, the controller failure diagnosing device may diagnose the controller as a failure.

As another example, if the rotating speed and the output torque of the motor are in the normal state and do not correspond to the first quadrant mode or the third quadrant mode among the four quadrant operation modes, the controller failure diagnosing device may diagnose the controller as a failure. Further, the first quadrant mode and the third quadrant mode may be set as normal areas of the integral controller. For example, if the rotating speed and the output torque of the motor are in the normal state and do not correspond to the first quadrant mode or the third quadrant mode, the controller failure diagnosing device may diagnose the controller as the failure. Further, if the controller is diagnosed as a failure, the controller failure diagnosing device may determine whether the rotating speed and the output torque of the motor are included in a preset control area condition, generate a signal for switching to 3-phase short according to the determination result, and transmit the signal to the controller.

Specifically, if it is determined that the rotating speed and the output torque of the motor are not included in the control area condition, the controller failure diagnosing device may generate a signal for switching to 3-phase short. Here, 3-phase short may be a state in which the upper switching element or the lower switching element for each phase of the inverter is simultaneously turned on by controlling the switching operation. Further, the controller failure diagnosing device may generate a switching signal such that the upper switching element or the lower switching element forming the 3-phase short state is alternately turned on based on the temperature of the switching element. This may additionally provide an effect of preventing thermal damage to the switching element due to a controller failure.

As described above, according to the present embodiments, there may be provided a controller failure diagnosing device and method that may diagnose a failure in the controller using the characteristics of the controller when using a motor and an inverter. In particular, there may be provided a controller failure diagnosing device and method capable of diagnosing a failure in a controller by comparing the measured 3-phase voltage of the motor and the calculated controller output voltage or by determining entry into an unstable control area condition at an early stage.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A controller failure diagnosing device, comprising:
a voltage measurer implemented as a detection circuit, and configured to measure a 3-phase voltage of a motor at an inverter output terminal connected to the motor;
a voltage calculator configured to inversely calculate a d-axis control voltage and a q-axis control voltage corresponding to an output voltage of a controller driving the motor, based on a design parameter of the controller and an input current of the controller including a d-axis reference current, a q-axis reference current, a d-axis feedback current, and a q-axis feedback current; and
a failure diagnoser implemented as a comparison circuit, and configured to diagnose a failure in the controller by comparing the measured 3-phase voltage and the calculated output voltage,
wherein if the controller is diagnosed as the failure, the failure diagnoser determines whether a rotating speed and an output torque of the motor are included in a preset control area condition, generates a switching signal to 3-phase short according to a result of the determination, and transfers the switching signal to the controller.

2. The controller failure diagnosing device of claim 1, wherein the controller includes a first controller generating the d-axis control voltage and a second controller generating the q-axis control voltage, and wherein the first controller and the second controller include a proportional controller and an integral controller, respectively.

3. The controller failure diagnosing device of claim 2, wherein if an output voltage of the integral controller is not varied in response to a variation in a current error input to the controller, the failure diagnoser diagnoses the controller as a failure.

4. The controller failure diagnosing device of claim 2, wherein if an output voltage of the proportional controller is not reduced even after a specific time when a current error input to the controller converges, the failure diagnoser diagnoses the controller as a failure.

5. The controller failure diagnosing device of claim 1, wherein if an output voltage of the controller is higher than a voltage of a battery supplying a direct current (DC) voltage to the inverter, the failure diagnoser diagnoses the controller as a failure.

6. The controller failure diagnosing device of claim 1, wherein if the rotating speed and the output torque of the motor are in a normal state, and do not correspond to a first quadrant mode or a third quadrant mode among four quadrant operation modes, the failure diagnoser diagnoses the controller as a failure.

7. The controller failure diagnosing device of claim 6, wherein the first quadrant mode and the third quadrant mode are set as a normal area of the integral controller.

8. The controller failure diagnosing device of claim 1, wherein if determining that the rotating speed and output torque of the motor are not included in the control area condition, the failure diagnoser generates the switching signal.

9. The controller failure diagnosing device of claim 1, wherein the 3-phase short is a state in which a switching operation is controlled so that an upper switching element or a lower switching element for each phase of the inverter is simultaneously turned on.

10. A controller failure diagnosing method, comprising:
measuring a 3-phase voltage of a motor at an inverter output terminal connected to the motor;
inversely calculating a d-axis control voltage and a q-axis control voltage corresponding to an output voltage of a controller driving the motor, based on a design parameter of the controller and an input current of the controller including a d-axis reference current, a q-axis reference current, a d-axis feedback current, and a q-axis feedback current; and
diagnosing a failure in the controller by comparing the measured 3-phase voltage and the calculated output voltage,
wherein, if the controller is diagnosed as the failure, the diagnosing of the failure in the controller includes determining whether a rotating speed and an output torque of the motor are included in a preset control area condition, generating a switching signal to 3-phase short according to a result of the determination, and transferring the switching signal to the controller.

11. The controller failure diagnosing method of claim 10, wherein the controller includes a first controller generating the d-axis control voltage and a second controller generating the q-axis control voltage, and wherein the first controller and the second controller include a proportional controller and an integral controller, respectively.

12. The controller failure diagnosing method of claim 11, wherein if an output voltage of the integral controller is not varied in response to a variation in a current error input to the controller, the diagnosing of the failure in the controller diagnoses the controller as a failure.

13. The controller failure diagnosing method of claim 11, wherein if an output voltage of the proportional controller is not reduced even after a specific time when a current error input to the controller converges, the diagnosing of the failure in the controller diagnoses the controller as a failure.

14. The controller failure diagnosing method of claim 10, wherein if an output voltage of the controller is higher than a voltage of a battery supplying a direct current (DC) voltage to the inverter, the diagnosing of the failure in the controller diagnoses the controller as a failure.

15. The controller failure diagnosing method of claim 10, wherein if the rotating speed and the output torque of the motor are in a normal state, and do not correspond to a first quadrant mode or a third quadrant mode among four quadrant operation modes, the diagnosing of the failure in the controller diagnoses the controller as a failure.

16. The controller failure diagnosing method of claim 15, wherein the first quadrant mode and the third quadrant mode are set as a normal area of the integral controller.

17. The controller failure diagnosing method of claim 10, wherein if determining that the rotating speed and output torque of the motor are not included in the control area condition, the diagnosing of the failure in the controller generates the switching signal.

18. The controller failure diagnosing method of claim 10, wherein the 3-phase short is a state in which a switching operation is controlled so that an upper switching element or a lower switching element for each phase of the inverter is simultaneously turned on.

* * * * *